Oct. 14, 1969 J. J. HANAK 3,472,694

DEPOSITION OF CRYSTALLINE NIOBIUM STANNIDE

Original Filed May 26, 1961

INVENTOR.
JOSEPH J. HANAK
BY Glenn H. Bruestle
ATTORNEY

United States Patent Office 3,472,694
Patented Oct. 14, 1969

3,472,694
DEPOSITION OF CRYSTALLINE NIOBIUM STANNIDE

Joseph J. Hanak, Trenton, N.J., assignor to RCA Corporation, a corporation of Delaware
Continuation of application Ser. No. 548,507, May 9, 1966, which is a division of application Ser. No. 112,871, May 26, 1961. This application Oct. 5, 1967, Ser. No. 673,222
The portion of the term of the patent subsequent to Aug. 22, 1983, has been disclaimed
Int. Cl. C23c *13/02*
U.S. Cl. 117—227 6 Claims

ABSTRACT OF THE DISCLOSURE

A vapor phase method of depositing a superconductive coating of niobium tin on a substrate. The substrate is heated in a mixture of niobium chloride and tin chloride vapors. Sufficient reducing gas is admixed with the chloride vapors so that the chlorides are reduced and the niobium and tin are co-deposited on the substrate. The mixed vapors are obtained in the proper molar ratio by passing chlorine over a mass of niobium tin.

CROSS REFERENCE TO RELATED APPLICATIONS

The invention described herein was made in the course of, or under contract with the Air Force.

This application is a continuation of application Ser. No. 548,507, filed May 9, 1966, now abandoned, which was a division of application Ser. No. 112,871, filed May 26, 1961, now abandoned.

BACKGROUND OF THE INVENTION

Field of the invention

This invention relates to an improved method of making a superconductor.

Superconducting materials are utilized to fabricate switches which operate rapidly at low temperatures. Liquid helium provides the very low temperatures necessary for operating many cryogenic devices, such as cryogenic switches. Cryogenic devices such as the cryotron have become increasingly important as computer components.

An important parameter of superconducting materials is the temperature at which the material ceases to be superconducting. This parameter is a fixed characteristic of each superconducting material, and is known as the critical temperature $T_c$. The superconducting material niobium tin or niobium stannide, which preferably corresponds to the composition $Nb_3Sn$, has a critical temperature $T_c$ of about 18° K., which is the highest value for any superconductor presently available. This material is synthesized according to the prior art by running molten tin over powdered niobium in a sealed quartz tube maintained at 1200° C. However, it has hitherto been very difficult to utilize niobium tin in cryogenic devices, because the matrial as ordinarily made by direct synthesis of the elements tends to be porous, chalky and brittle. It does not have a metallic appearance or lustre.

Attempts to form niobium tin in desired shapes by sintering the compressed powder have not been satisfactory. The material tantalum tin is also a superconductor, but suffers from the same drawbacks.

Accordingly, it is an object of this invention to provide improved superconducting materials.

Another object of this invention is to provide improved methods of fabricating improved superconducting materials.

SUMMARY OF THE INVENTION

These and other objects are attained, according to the invention, by providing an article of manufacture comprising a substrate having at least a portion of the surface thereof covered with an adherent coating consisting essentially of at least one member of the group consisting of crystalline niobium tin and crystalline tantalum tin. It has now been found that a crystalline coating of niobium tin or tantalum tin or mixtures of these can be deposited on a substrate by the steps of heating the substrate, passing the mixed vapors of tin chloride and at least one member of the group consisting of tantalum chloride and niobium chloride over the substrate, and admixing sufficient reducing gas into the mixed vapors so that said chlorides are reduced and the metal portions thereof are deposited on the substrate.

BRIEF DESCRIPTION OF THE DRAWING

The invention will be described in greater detail in conjunction with the accompanying drawing, in which.

DESCRIPTION OF THE PREFERRED EMBODIMENTS

Figure 1:
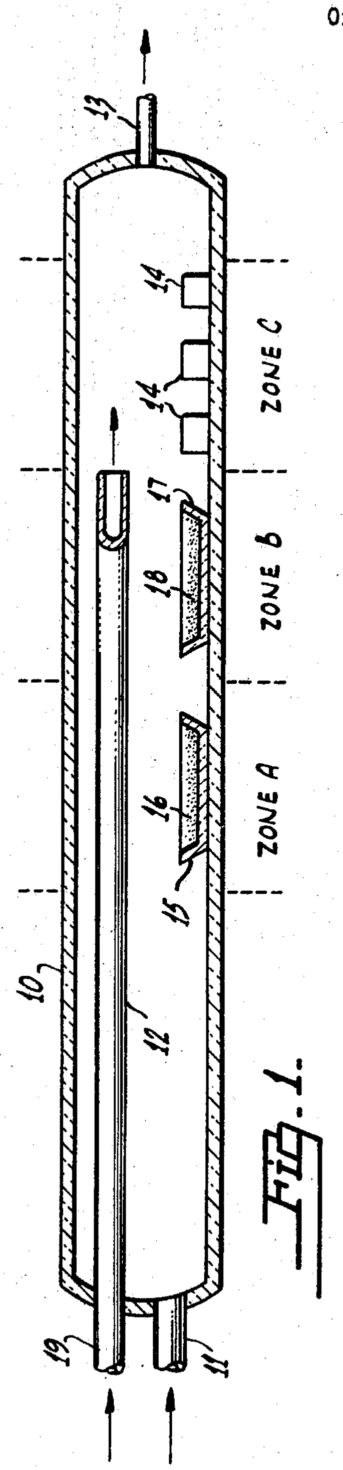
FIG. 1 is a schematic diagram of apparatus useful in one embodiment of the invention; and, FIGURE 2 is a schematic diagram of apparatus useful in another embodiment of the invention.

*Example I.*—In this example, the substrate to be coated with niobium tin is an insulator such as quartz, porcelain, forsterite, steatite, alumina, and the like. The apparatus utilized in this embodiment comprises a refractory furnace tube 10 having an inlet 11 projecting from one end, and an outlet 13 at the other end, as shown in FIG. 1. A delivery tube 12 is sealed within the furnace tube 10. The delivery tube 12 has an inlet 19 projecting from the same end of the furnace tube 10 as inlet 11, and extends about three-quarters of the length of the furnace tube 10. A single substrate may be coated, or a plurality of substrates may be coated simultaneously. The latter is advantageous when it is desired that the niobium tin coatings on a plurality of substrates be of uniform thickness. The substrates 14, which in this example are alumina ceramic plates, are positioned within furnace tube 10 between outlet 13 and the internal end of delivery tube 12. The portion of furnace tube 10 containing substrates 14 is hereinafter designated as "zone C." A furnace boat 17 is positioned in furnace tube 10 between inlet 11 and substrates 14, but adjacent to substrates 14. The portion of furnace tube 10 containing boat 17 is hereinafter designated as "zone B." Another furnace boat 15 is positioned in furnace tube 10 between inlet 11 and furnace boat 17, but adjacent boat 17. The portion of furnace tube 10 containing boat 15 is hereinafter designated as "zone A." Heating means (not shown) are provided so that zones A, B and C of furnace tube 10 may be kept at different predetermined temperatures.

In this example, a quantity 16 of niobium pentachloride $NbCl_5$ is placed in furnace boat 15 and a quantity 18 of stannous chloride $SnCl_2$ is placed in boat 17. Furnace zone A is maintained at 119° C., zone B is maintained at about 302° C., and zone C at about 650° C. to 850° C. These temperatures were selected to yield a vapor pressure of $NbCl_5$ which is three times the vapor pressure of the $SnCl_2$ present. A stream of an inert carrier gas, such as helium, argon, and the like, is passed into furnace tube 10 at inlet 11. In this example, the carrier gas consists of argon. The arrows in the drawings indicate the direction of gas flow. Niobium pentachloride is being continuously vaporized at boat 15. The stream of carrier gas passes over boat 15 and sweeps along the vapors of niobium pentachloride, then passes over boat 17, where stannous chloride is being vaporized, and sweeps along the vapors of stannous chloride. The mixture of the carrier gas and the vaporized chloride passes over substrates 14 and exits from the furnace tube 10 at outlet 13. As a result of the difference in vapor pressures mentioned above, the molar ratio of $NbCl_5$ to $SnCl_2$ in the mixture is maintained within the range from 4:1 to 1:1. The temperature of the carrier gas flow rises progressively in its passage through furnace tube 10 from about 119° C. in zone A to about 302° C. in zone B to about 800° C. in zone C. The rate of the carrier gas flow utilized is dependent on the dimensions of the furnace tube and the rate of niobium tin deposit desired. For a furnace tube 40″ long and 1.5″ in internal diameter, a carrier gas rate of flow of about 0.5 to 1 liter per minute has been found satisfactory.

After the flow of the carrier gas has been established and a stream of the mixed vapors of niobium pentachloride and stannous chloride is passing over the substrates 14, a stream of a reducing gas such as hydrogen is passed into delivery tube 12 by way of inlet 19. The rate selected for the hydrogen flow is dependent on the dimensions of furnace tube 10 and the rate of niobium tin deposit desired. In this example, a hydrogen rate of flow of 2 to 4 liters per minute was found suitable. The inlet tube 12 discharges the hydrogen directly into the hot reaction zone C, and thus prevents any premature reduction of the chlorides in zones A and B. The reaction in zone C between the hydrogen and the vaporized mixture of chlorides may be represented by the equation $$6NbCl_5+2SnCl_2+17H_2 \rightarrow 2Nb_3Sn+34HCl$$

The reaction thus results in the deposition of a coating of niobium tin on the substrates 14, and also on the inner wall of zone C of furnace tube 10. The hydrogen chloride formed during the reaction leaves furnace tube 10 by way of outlet 13, along with unreacted hydrogen, unreacted vapors of the chlorides, and the inert carrier gas.

An adherent coating of niobium tin is thus deposited over the surface of substrates 14. It has unexpectedly been found that the niobium tin coating thus formed is visibly crystalline, whereas no crystals can be seen in material synthesized according to the prior art. Moreover, the coating is superconducting up to a relatively high critical temperature, close to the critical temperature of pure $Nb_3Sn$, and may be deposited on a substrate of any desired shape. The thickness of the coating may be varied from a transparent film only a few angstroms thick to a few hundred microns or more, as desired, depending on the period of time for which the substrate is exposed to the reactants and the concentration of the reactants in the furnace tube. Metallographic examination of these films has shown them to be non-porous and of greater density than the materials obtained by sintering niobium tin according to the prior art. The crystalline character of the niobium tin coatings formed according to the invention is easily seen in microphotographs. Furthermore, the crystalline coatings of niobium tin thus deposited were found to have the same high critical temperature $T_c$ (about 18° K.) as the best sintered niobium tin made according to the prior art.

*Example II.*—The method described above may also be utilized to deposit a crystalline coating of niobium tin on a metal such as tantalum, molybdenum, rhodium, and the like. In this example, the substrate 14 is a tantalum cylinder. The method described in Example I is utilized to deposit a superconductive crystalline niobium tin coating over the inside of the tantalum cylinder. The article thus formed may be utilized as a low-loss wave-guide or resonating cavity for microwaves, when utilized at temperatures below the critical temperature of the coating.

*Example III.*—The method of the invention may also be utilized to deposit a coating of niobium tin on a semiconductor such as silicon, or on boron nitride, silicon carbide, and the like. The embodiment of Examples I and II may be modified to utilize stannic chloride $SnCl_4$ instead of stannous chloride $SnCl_2$. Since the vapor pressure of stannic chloride $SnCl_4$ is considerably higher than that of stannous chloride $SnCl_2$, the stannic chloride is placed in furnace boat 15 situated in the lowest temperature zone A, and is maintained at 25° C. The niobium pentachloride is placed in boat 17 situated in zone B of the furnace tube. Zone B is maintained at 150° C. Under these conditions, the vapor pressure of the stannic chloride is about .05 atmosphere, and the vapor pressure of the niobium pentachloride is about three times as great, thus insuring that the ratio of niobium chloride molecules to tin chloride molecules in the mixed vapor will be about 3:1. This latter ratio is preferred because the niobium tin deposited contains three atomic weights of Nb per atomic weight Sn. The substrates 14 in this example consist of silicon. The process is performed as described in Example I by sweeping an inert carrier gas through furnace tube 10 by way of inlet 11 and outlet 13, then passing hydrogen into the hot reaction zone C by means of delivery tube 12. The rates of flow for the carrier gas and the hydrogen may be the same as in Example I, the principal difference being that stannic chloride is now in zone A, niobium pentachloride is now in zone B, and the temperatures of zones A and B are lower than in Example I. The reaction which takes place under these conditions may be represented by the equation $$6NbCl_5+2SnCl_4+19H_2 \rightarrow 2Nb_3Sn+38HCl$$

A crystalline coating of niobium tin is thus deposited on the semiconductor substrate.

*Example IV.*—The method of the invention may also be utilized to deposit a coating of niobium tin on a substrate consisting of a metallic alloy such as molybdenum-chromium alloys, rhodium-palladium alloys, tungsten alloys, tantalum alloys, and the like. In this example, the substrate 14 is a rhodium-palladium alloy in the form of a hollow tube or pipe having a square cross section. A crystalline coating of niobium tin is deposited on the alloy by the embodiment of the invention described above in Example III.

Figure 2:
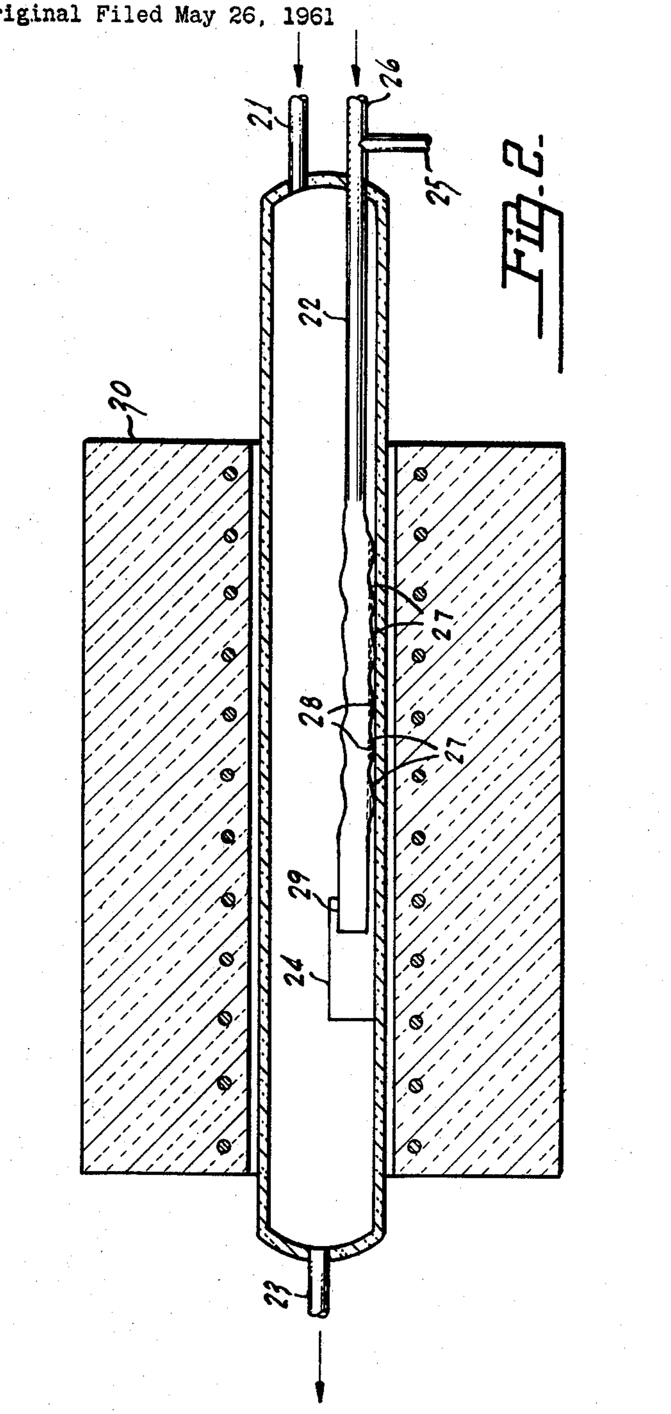

*Example V.*—According to another embodiment of the invention, the molar ratio of niobium chloride to tin chloride in the mixed vapors is automatically maintained at the desired 3:1 ratio. Moreover, this embodiment may be utilized with a single-zone furnace. Apparatus suitable for this embodiment comprises a refractory furnace tube 20 having an inlet 21 at one end, and an outlet 23 at the opposite end, as shown in FIG. 2. A refractory delivery tube 22 is sealed within furnace tube 20. The delivery tube 22 has two inlets 25 and 26 on the same end of furnace tube 20 as inlet 21, and extends about three-quarters of the length of the furnace tube 20. In the central portion of the delivery tube 22 are one or more enlarged portions 27. A mass or quantity 28 of the sintered niobium tin made according to the prior art is placed in each enlarged portion 27 of the delivery tube 22. A substrate 24, which in this example is a quartz pipe, is positioned in furnace tube 20 adjacent and with one end around the internal orifice 29 of the delivery tube 22. The entire furnace tube 20 is maintained at about 1000–1200° C. by means of furnace 30.

The process is now conducted by passing a stream of chlorine and an inert carrier gas such as argon, neon, and the like, through the delivery tube 22. In this example, chlorine gas is passed in inlet 26 at the rate of 5 to 10 ml. per minute, and argon is passed into inlet 25 at the rate of about 0.5 liter per minute. The direction of flow of the gases in this example is shown by the arrows in FIG. 2. The mixture of chlorine and carrier gas passes over the masses 28 of sintered $Nb_3Sn$ in the enlarged portions 27 of delivery tube 22. The chlorine in the mixture reacts with the sintered niobium tin to form a mixture of niobium chloride and tin chloride vapors. The ratio of niobium chloride to tin chloride in the mixed vapors is thus automatically kept at the desired level of 3:1. The mixture of the chloride vapors, the carrier gas, and the unreacted chlorine passes out of delivery tube 22 by way of orifice 29, and is thus directed against the substrate 24. At the same time, a stream of hydrogen is passed into inlet 21 and through furnace tube 20. In this example, the rate of flow of the hydrogen is about 2 to 4 liters per minute. The hydrogen reduces the chloride vapors which stream from orifice 29 over the substrate 24. A coating of crystalline niobium tin is thus deposited on the substrate 24. The unreacted chlorides, hydrogen, and carrier gas leave the furnace tube 20 by way of outlet 23. An advantage of this embodiment is that the rate of deposition of the niobium tin coating can be accurately controlled by varying the rate of flow of the chlorine gas, which in turn varies the vapor pressure of the chlorides in the mixture of gases that leaves delivery tube 22.

While in the above Example V the substrate utilized was an insulator, it will be appreciated that the substrate may instead be a metal such as tungsten, molybdenum, and the like, or a semiconductor such as silicon carbide, boron nitride, and the like, or an alloy such as rhodium-palladium, nickel-chromium, and the like.

An indication of the superior quality of the niobium tin crystalline coating according to the invention is the increased density of the material. The theoretical density for $Nb_3Sn$, assuming a perfect crystal lattice, is 8.92 grams per $cm.^3$. The density of the sintered niobium tin made according to the prior art is only about 7.0 grams per $cm.^3$. In contrast, the density of the visibly crystalline niobium tin deposited according to the invention is about 8.9 grams per $cm.^3$, which is about 99.7 percent of the limiting theoretical density. Furthermore, the crystalline niobium tin produced according to the invention is characterized not only by being non-porous, but also by having a metallic appearance and lustre. The crystalline niobium tin deposited according to the invention may not have the exact stoichiometric composition corresponding to 75 atomic percent niobium-25 atomic percent tin, since it has been reported that the amount of niobium may vary from 50 to 80 atomic percent without varying the critical temperature $T_c$ more than 1° K.

Various modifications and variations may be made in the process disclosed. For example, tantalum chloride may be utilized instead of niobium chloride. Substrates may thus be coated with crystalline tantalum tin which preferably corresponds to the composition $Ta_3Sn$ and is a superconductor having a critical temperature $T_c$ of 6.4° K. Alternatively, a mixture of niobium chloride and tantalum chloride may be utilized to form superconductive coatings which are a mixture of tantalum tin and niobium tin, thus exhibiting a critical temperature at any desired intermediate value between about 6.4° K. and 18° K. When a mixture of niobium chloride and tantalum chloride is used, the molar ratio of the niobium chloride plus the tantalum chloride to the tin chloride in the mixed vapors is preferably maintained at from about 4:1 to 1:1. The use of a carrier gas is desirable but not essential, since the invention may also be practiced by passing a stream of chlorine only over niobium tin, or over separate masses of niobium and of tin. The method of the invention may also be utilized to deposit "whiskers" or single crystals of niobium tin by suitably arranging the reduction process to provide selective nucleation and growth of the crystalline deposit.

I claim:

1. The method of depositing a coating consisting essentially of crystalline niobium tin on a substrate, comprising the steps of heating said substrate, passing the mixed vapors of tin chloride and niobium chloride over said substrate, and admixing sufficient reducing gas into said mixed vapors so that said chlorides are reduced and the metal portions thereof are deposited on said substrate.

2. The method of depositing a coating consisting essentially of crystalline niobium tin on a substrate, as in claim 1, wherein said substrate is heated at a temperature between about 800° C. and 1400° C.

3. The method of depositing a coating consisting essentially of crystalline niobium tin on a substrate, comprising the steps of heating said substrate, passing the mixed vapors of tin chloride and niobium chloride over said substrate, maintaining the molar ratio of niobium chloride to tin chloride in said mixed vapors at from about 4:1 to 1:1, and admixing sufficient hydrogen into said mixed vapors so that at least a portion of said chlorides are reduced and the metal portions thereof are deposited on said substrate.

4. The method of depositing a coating of crystalline niobium tin on a substrate, comprising the steps of heating said substrate, passing chloride gas over niobium tin to form the mixed vapors of niobium chloride and tin chloride, the ratio of niobium chloride to tin chloride in said mixed vapors being about 3:1, passing said mixed vapors over said heated substrate, and admixing sufficient hydrogen into said mixed vapors so that said chlorides are at least partially reduced and the metal portions of said reduced chlorides are deposited on said substrate.

5. The method of depositing a coating consisting essentially of crystalline niobium tin on a stationary substrate, comprising:

(a) positioning a quantity of niobium pentachloride in a first zone of a furnace tube adjacent to the inlet of said furnace tube;

(b) positioning a quantity of stannous chloride in a second zone of said furnace tube adjacent to said first zone;

(c) positioning said substrate in a third zone of said furnace tube between said second zone and the outlet of said furnace tube;

(d) passing a stream of an inert carrier gas through said furnace tube form said inlet to said outlet to sweep vapors of niobium chloride and stannous chloride into said third zone while maintaining said first zone at a temperature of about 119° C., maintaining said second zone at a temperature of about 302° C., and maintaining said third zone at atemperature of about 650° C. to 850° C.; and, (e) passing a stream of hydrogen directly into said third zone of said furnace tube so that at least a portion of said niobium chloride vapors and tin chloride vapors are reduced and a coating of niobium tin is deposited on said substrate.

6. The method of depositing a coating consisting essentially of crystalline niobium tin on a stationary substrate, comprising:

(a) positioning a quantity of niobium tin in a delivery tube which is sealed within a furnace tube, said delivery tube having a first orifice external said furnace tube and a second orifice internal said furnace tube;

(b) positioning said substrate in said furnace tube immediately adjacent to said second orifice of said delivery tube;

(c) maintaining said furnace tube at about 1000° C. to 1200° C. while passing a stream of chloride and an inert carrier gas through said delivery tube from said first orifice to said second orifice to form a mixture of niobium chloride vapors; and, (d) passing a stream of hydrogen through said furnace tube so that at least a portion of said niobium chloride vapors and tin chloride vapors are reduced, and a coating of niobium tin is deposited on said substrate.

References Cited

UNITED STATES PATENTS

| | | | |
|---|---|---|---|
| 2,885,310 | 5/1959 | Olson et al. | 117—227 |
| 3,028,341 | 4/1962 | Rosi et al. | |
| 3,065,116 | 11/1962 | Marinace | 148—175 |
| 3,181,936 | 5/1965 | Denny et al. | 29—194 |
| 3,268,362 | 8/1966 | Hanak et al. | 117—1072 X |

OTHER REFERENCES

Powell et al., Vapor Plating, published by John Wiley and Sons, 1955, pp. 8 to 12, 36 and 37 relied on.

ALFRED L. LEAVITT, Primary Examiner

A. GOLIAN, Assistant Examiner

U.S. Cl. X.R.

117—107.2